United States Patent

Shaanan et al.

[11] Patent Number: 5,875,500
[45] Date of Patent: Mar. 2, 1999

[54] ABOVE GROUND SWIMMING POOL

[75] Inventors: Gad Shaanan, Montreal; Walter Francovich, Pierrefonds; Serge Dubeau, Montreal, all of Canada

[73] Assignee: 2679965 Canada Inc., LaSalle, Canada

[21] Appl. No.: 871,539

[22] Filed: Jun. 9, 1997

[51] Int. Cl.[6] .................................................. E04H 4/04
[52] U.S. Cl. ................. 4/506; 52/245; 403/348
[58] Field of Search ................... 4/506; 52/245; 403/348, 350, 409.1

[56] References Cited

U.S. PATENT DOCUMENTS

| | | |
|---|---|---|
| 3,233,251 | 2/1966 | Barrera ........................ 52/245 |
| 3,274,621 | 9/1966 | Diemond et al. . |
| 3,427,663 | 2/1969 | O'Connell et al. . |
| 3,869,736 | 3/1975 | Valois et al. . |
| 3,874,132 | 4/1975 | Mendelow et al. ............... 4/506 X |
| 3,908,330 | 9/1975 | Frach et al. ................. 403/348 X |
| 4,035,097 | 7/1977 | Bachand ........................ 403/348 |
| 4,104,951 | 8/1978 | Leitner ...................... 403/409.1 X |
| 4,124,907 | 11/1978 | Laven .......................... 4/506 X |
| 4,167,084 | 9/1979 | Brunton ........................ 4/506 X |
| 4,413,361 | 11/1983 | Wolf et al. ....................... 4/506 |
| 5,054,135 | 10/1991 | Dallaire et al. .................... 4/506 |
| 5,083,327 | 1/1992 | Gillebaard ........................ 4/506 |
| 5,155,872 | 10/1992 | Aymes ............................ 4/506 |
| 5,231,807 | 8/1993 | Aymes .......................... 4/506 X |
| 5,346,349 | 9/1994 | Giovannetti ................. 403/350 X |
| 5,445,472 | 8/1995 | Oukouchi ....................... 403/348 |

*Primary Examiner*—David J. Walczak
*Assistant Examiner*—Kathleen J. Prunner
*Attorney, Agent, or Firm*—Birch, Stewart, Kolasch & Birch, LLP

[57] ABSTRACT

An above-ground pool is made up of a plurality of posts, wherein each post is a blow-molded unit having a base portion and a top portion with a coping seat. A plurality of coping members also blow-molded are each telescopically received one end to the other at the coping seat of the top of each post, and a one-piece fastener engages the overlapping telescopic ends of the coping members to the top of the post. A bracket is provided at the base of the post, the bracket having a rail for receiving track segments wherein an elongated flexible metal wall is inserted. The top of the flexible wall is retained by the coping member against the post.

9 Claims, 8 Drawing Sheets

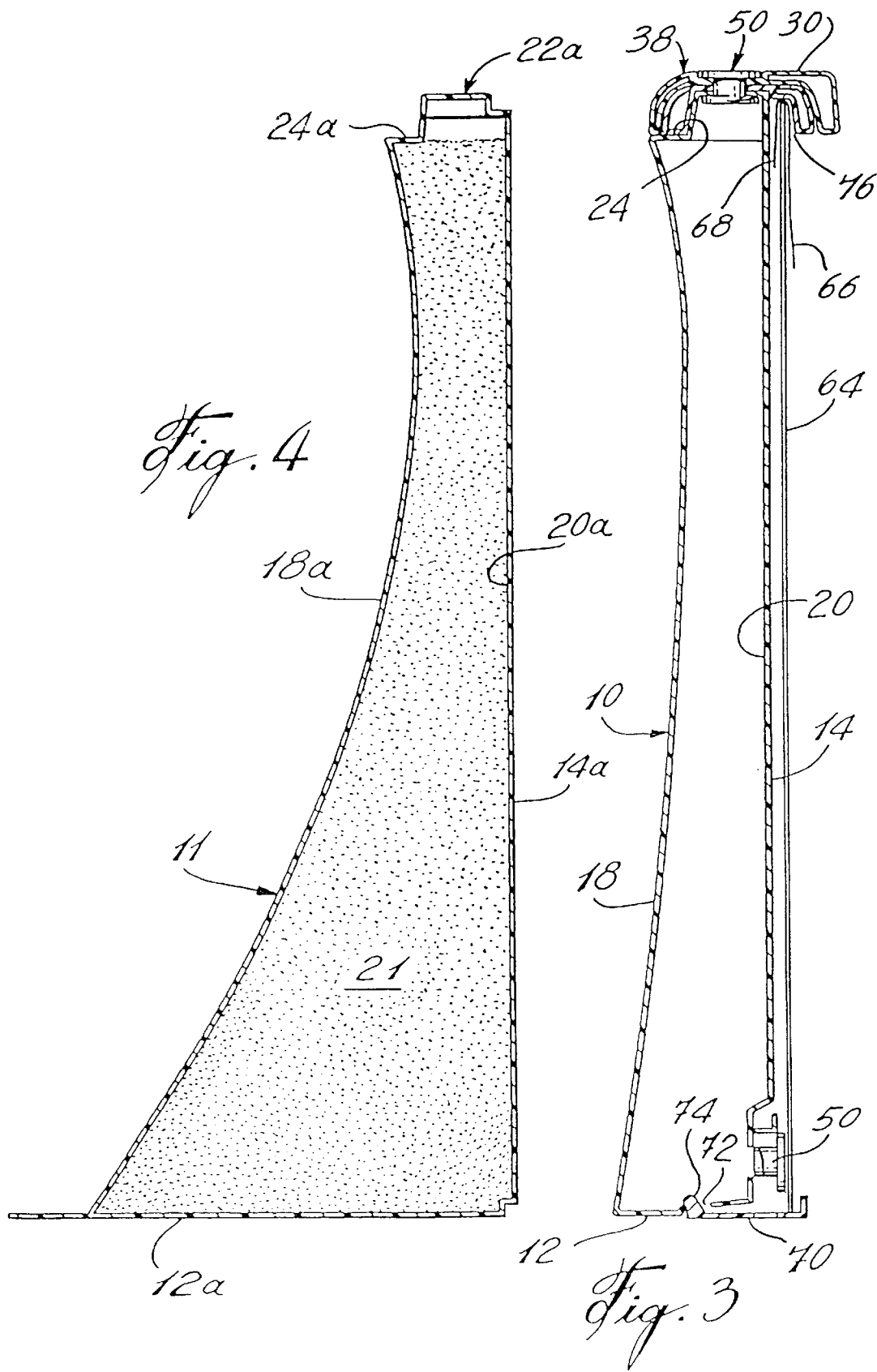

ABOVE GROUND SWIMMING POOL

BACKGROUND OF THE INVENTION

1. Field of the Invention

The present invention relates to an above ground swimming pool, and more particularly, to a swimming pool having a water impermeable liner, at least an upstanding panel surrounding the liner, and an improved coping structure with upstanding posts.

2. Description of the Prior Art

Present day above ground pools generally have posts and coping structures supporting a single endless panel. However, most such structures rely on nuts and bolts to connect the many posts and coping elements together. On a large pool, that is, an obround pool in the order of 40 feet, the number of posts and coping sections is considerable, and as a result, the number of nuts and bolts that must be utilized is considerable. The labor required for erecting such a pool is, therefore, substantial.

Since the posts and coping elements must form an enclosed loop, the elements forming it must be produced with precision. There can be very little tolerances when erecting a structure that might measure over 100 feet in terms of the loop being formed.

Examples are illustrated in U.S. Pat. Nos. 3,274,621, Diemond et al, 1966; 3,869,736, Valois et al, 1975; 4,413,361, Wolf et al, 1983; and 5,155,872, Aymes, 1992. Each one of these pools shows the necessity of precision in the fabrication of the posts and coping sections or upper rails and lower rails. Even assuming relatively low tolerances in the fabrication of swimming pool components, imprecise connections will still occur over the overall installation of the pool wall because of the accumulation of the tolerances over the relatively large dimensions of the loop being formed. These problems will occur at the installation phase in the field and must be overcome by sometimes damaging the last components being connected in order to get the parts to fit.

Another disadvantage that has been found with conventional above ground pool kits, as represented by the above patents, is the number of fasteners that must be manipulated in the field in order to erect the pool. Such manipulation of fasteners, such as nuts and bolts, requires an inordinate amount of labor at the site.

SUMMARY OF THE INVENTION

It is an aim of the present invention to provide an improved above ground pool construction that will overcome the problems mentioned above.

It is a further aim of the present invention to provide an above ground pool wherein the various elements, such as the upper rails or coping elements, can be telescoped one with the other in order to compensate for any imperfections.

It is still a further aim of the present invention to provide an above ground pool with elements, such as posts and coping components, that are molded of resin material especially by blow-molding. Since it is practically impossible to blow-mold such elements with small dimensional tolerances, it would not be possible to produce a practical, large, above ground swimming pool made of blow-molded components without allowing for some degree of adjustment such as having these components telescopically adjustable.

It is a further aim of the present invention to provide a special, simple, one-piece fastener that can be utilized with the components of the present invention and thus eliminate the necessity of using a large number of nuts and bolts.

A construction in accordance with the present invention comprises a kit for an above ground pool, including a plurality of posts with each molded in one piece from resin material and having a base portion and a top portion with a coping seat. A plurality of coping elements are each molded in one piece from resin material and have one end including a female coupling member and the other end of the coping member having a male longitudinally slotted coupling member adapted to telescopingly engage the female coupling member. A one-piece fastening member is adapted to engage the coupled male and female members when they are telescoped together end to end and coincident with the coping seat on the top of one of the posts, whereby the fastening member will engage the post and fix the coupling members of adjacent coping members. The kit also includes bottom rail sections, a pool panel, and a pool liner adapted to be supported by the coping so formed.

In a more specific embodiment of the present invention, the fastener member is a one-piece member having a top tool-engageable portion, a stem portion, and opposed wings extending from the bottom of the stem having camming surfaces such that, when the fastener member is passed through the slots in at least two components of the kit, the fastener may be rotated to secure the components together.

Thus, the pool is simple to erect and does not require professional installers but may be erected by amateurs.

In a still more specific embodiment, the posts and coping members are blow-molded.

BRIEF DESCRIPTION OF THE DRAWINGS

Having thus generally described the nature of the invention, reference will now be made to the accompanying drawings, showing by way of illustration, a preferred embodiment thereof, and in which:

FIG. 3 is a vertical cross-section of an element shown in FIG. 2;

FIG. 4 is a vertical cross-section, similar to FIG. 3, but of another embodiment of the same element;

DESCRIPTION OF THE PREFERRED EMBODIMENTS

Figure 1:
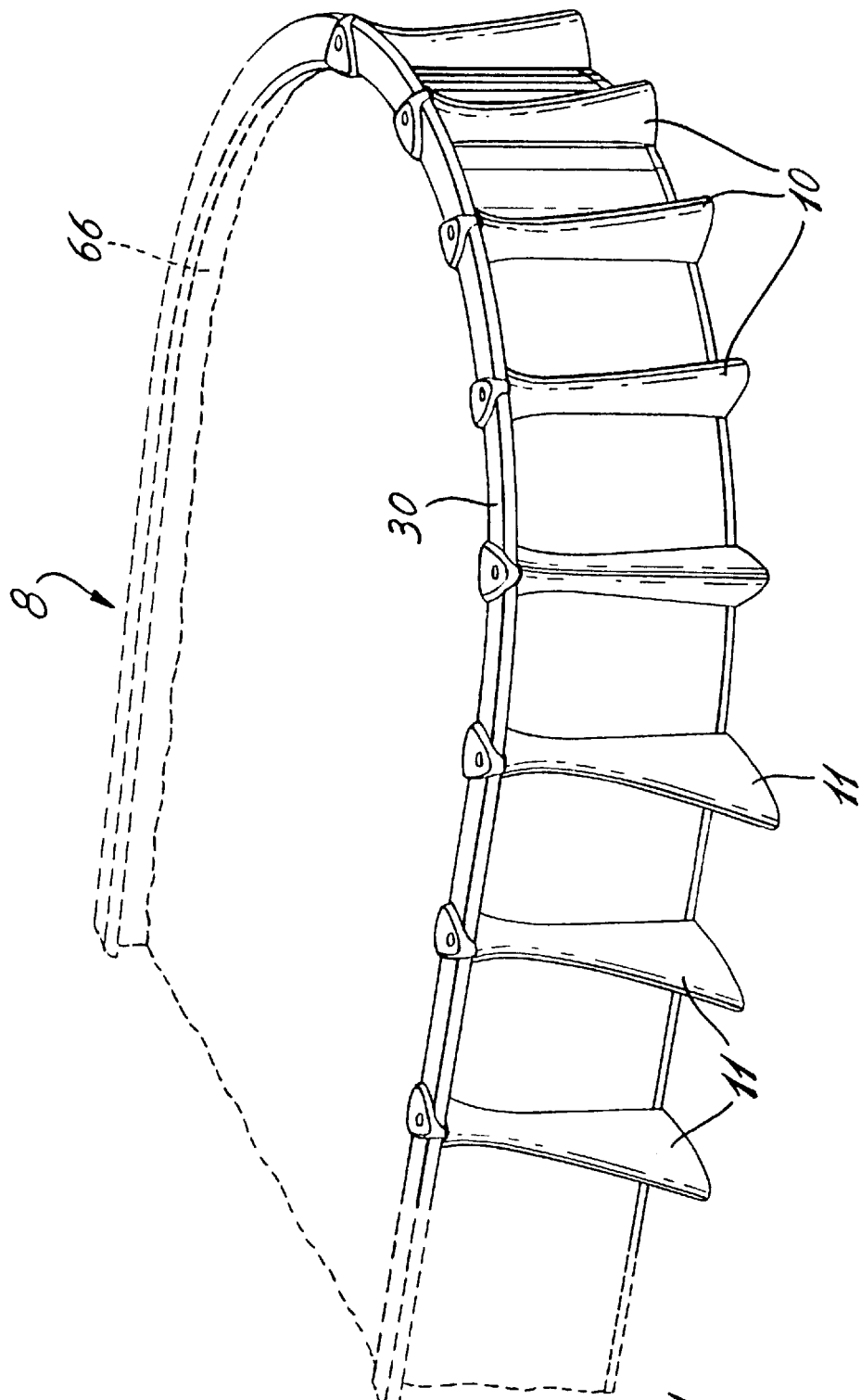
FIG. 1 is a perspective view of an above ground pool, partly in dotted lines, including elements in accordance with the present invention.

Referring now to the drawings, there is shown a swimming pool 8 forming an obround loop. The pool is shown with a typical pool liner 66 and a structure including upstanding posts 10 and 11 as well as coping elements 30 extending between each post.

Figure 2:
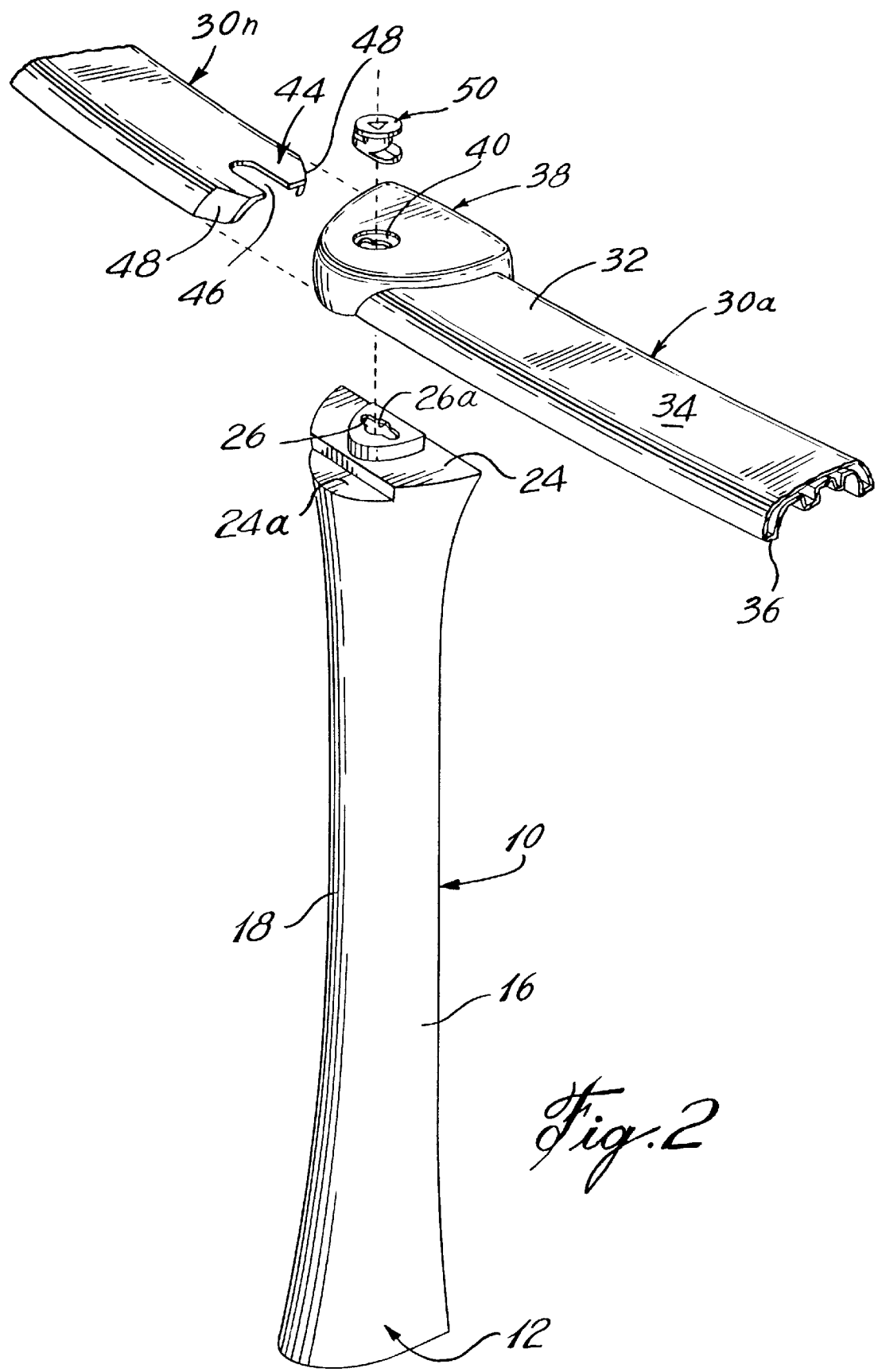
FIG. 2 is an exploded perspective view of a detail of the present invention.
Figure 5:
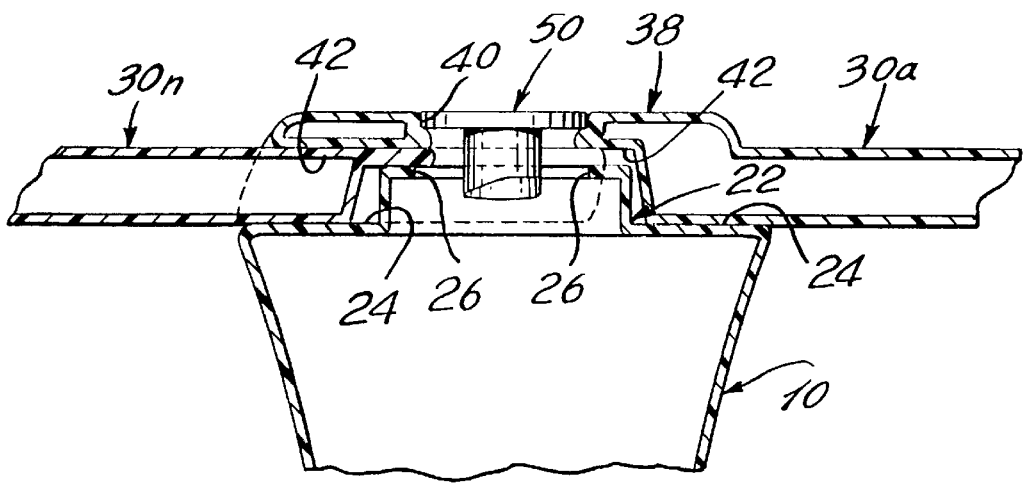
FIG. 5 is a fragmentary enlarged vertical cross-section of a detail of the present invention.

FIG. 2 shows a typical post 10 along with its connection with the coping members 30. The post 10, as shown in FIGS. 2, 3, and 5, includes an elongated upstanding blow-molded plastic member having a base 12, a front wall 14 which is a planar flat wall, a rear wall 18, and side walls 16. The post is hollow as shown at 20 which shows an interior portion of the front wall 14 in FIG. 3. The post has a coping seat 22 defined by stepped shoulders 24, 24a and an upstanding member having an elongated opening 26 intersecting a circular central opening 26a. The post 10 is designed for a circular pool or the ends of an obround pool, as shown in FIG. 1. The post 11, shown in FIG. 4, has a stepped shoulder 24a, coping seat 22a and a front wall 14a and a more pronounced flare towards a larger base 12a. Thus, the rear wall 18a has a fairly pronounced concave curve and this to provide a larger base 12a for greater support along the linear sides of the obround pool 8. However, for the purposes of the present invention, the posts 10 and 11 are quite similar in structure. As shown in FIG. 4, a ballast, such as water or sand 21, may be injected into the hollow interior 20, 20a of the posts 10 or 11 once the post has been erected in order to give the post more stability and to strengthen the column formed.

The coping 30 may also be made from a blow-molding process of a suitable thermoplastic material. The coping member 30 may be linear or slightly curved depending on its position on the swimming pool, that is, if it is in a radius at the end of the pool or in the straight walls on the sides of an obround pool. Several coping members having different radii will be manufactured for use with different sized pools. However, each coping member has a beam structure 32 with a top surface 34 and a bottom surface 36. The top surface 34 is normally smooth without any sharp corners while the bottom structure may be provided with different strengthening ribs and normally a recess for receiving the pool panel and liner.

Figure 6:
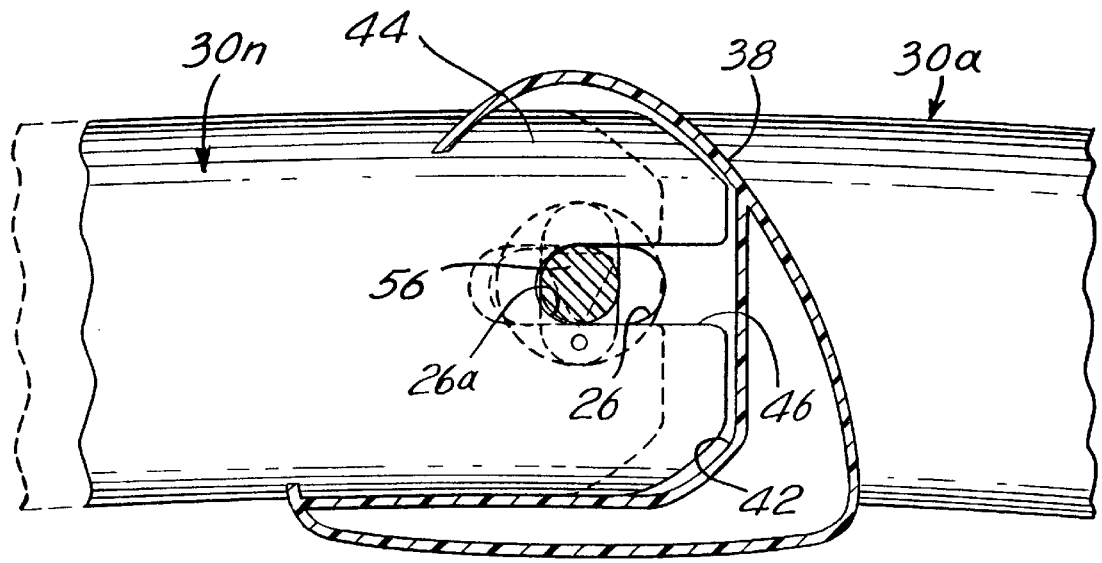
FIG. 6 is an enlarged fragmentary horizontal cross-section showing the detail of FIG. 5.

The coping 30 includes a female coupling member 38 at one end thereof and a male coupling member 44 at the other end thereof. The female coupling member 38, as shown in FIGS. 2, 5, and 6, includes a recessed portion 42 and an opening 40 which, when mounted to the post 10, will be coincident with the opening 26 in the top of the post 10.

The male coupling member 44 at the other end of the coping member 30 includes an elongated open slot 46 and tapered ends 48.

The kit for erecting a pool includes several coping members 30a to 30n. The male coupling member 44 of coping member 30n is inserted into the recess 42 of the female coupling member 38 in a telescopic sliding manner. The slot 46 will be aligned with the openings 26 and 40 in order to receive the fastening member 50.

Figure 7:
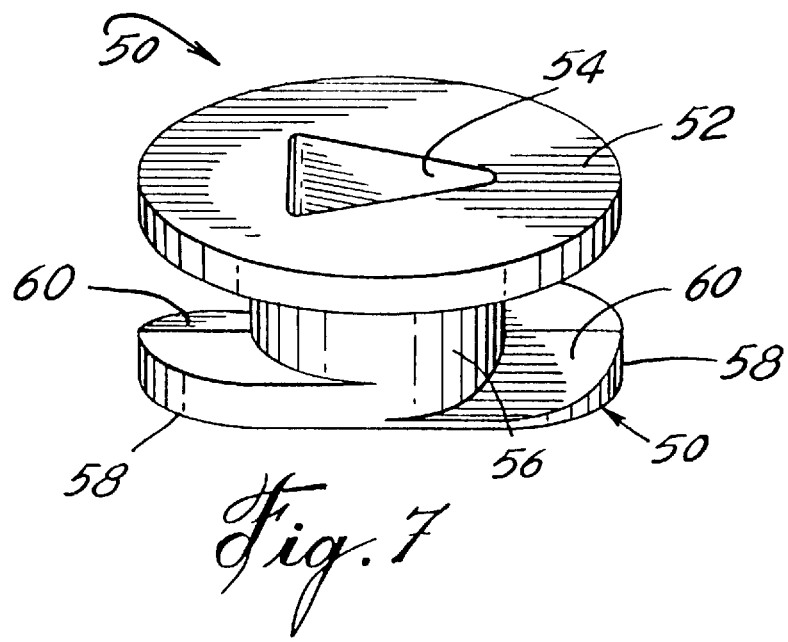
FIG. 7 is a perspective view of a detail of the present invention.
Figure 8:
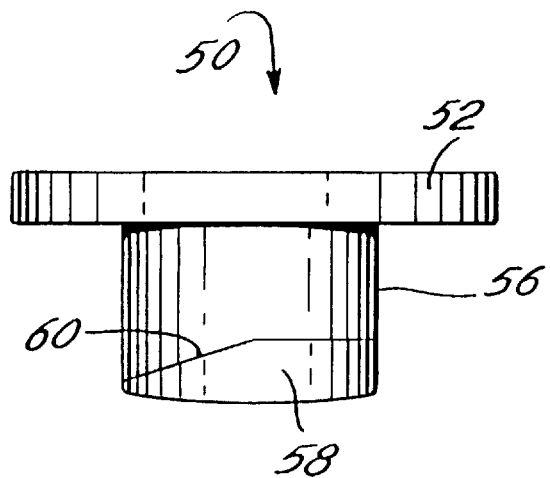
FIG. 8 is a side elevation of the detail shown in FIG. 7.

As shown in FIGS. 7 and 8, fastening member 50 includes a cap 52 with a socket 54 defined therein from the top. A stem 56 extends downwardly from the cap 52, and a pair of diametrically opposed wings 58 extends from the bottom of the stem 56. The wings 58 include camming surfaces 60, as shown in FIGS. 7 and 8.

When it is desired to connect a post with a pair of coping members 30a and 30n, the coping member 30n, with its male coupling member 44, is inserted into the recess 42 of the female coupling member 38, and the male member 44 is adjusted telescopically therein. The fastener member 50 is then inserted through the opening 40 with the wings 58 aligned with the major axes of the elongated openings. The fastener 50 is pushed down until the wings 58 are within the post 10, that is, through the opening 26. The fastener 50 is then rotated 90° by means of a suitable tool inserted in the socket 54. By rotating the fastener member 50, the camming surfaces 60 will engage the interior of the coping seat 22 and the top surface of the female coupling member 38 to tightly sandwich the elements together. The coupling member 44 is adjustably aligned or telescoped within the female coupling member 38, and it does not matter to what depth the coupling member 44 has been inserted as long as the slot 46 is aligned vertically with the openings 40 and 26.

Figure 9:
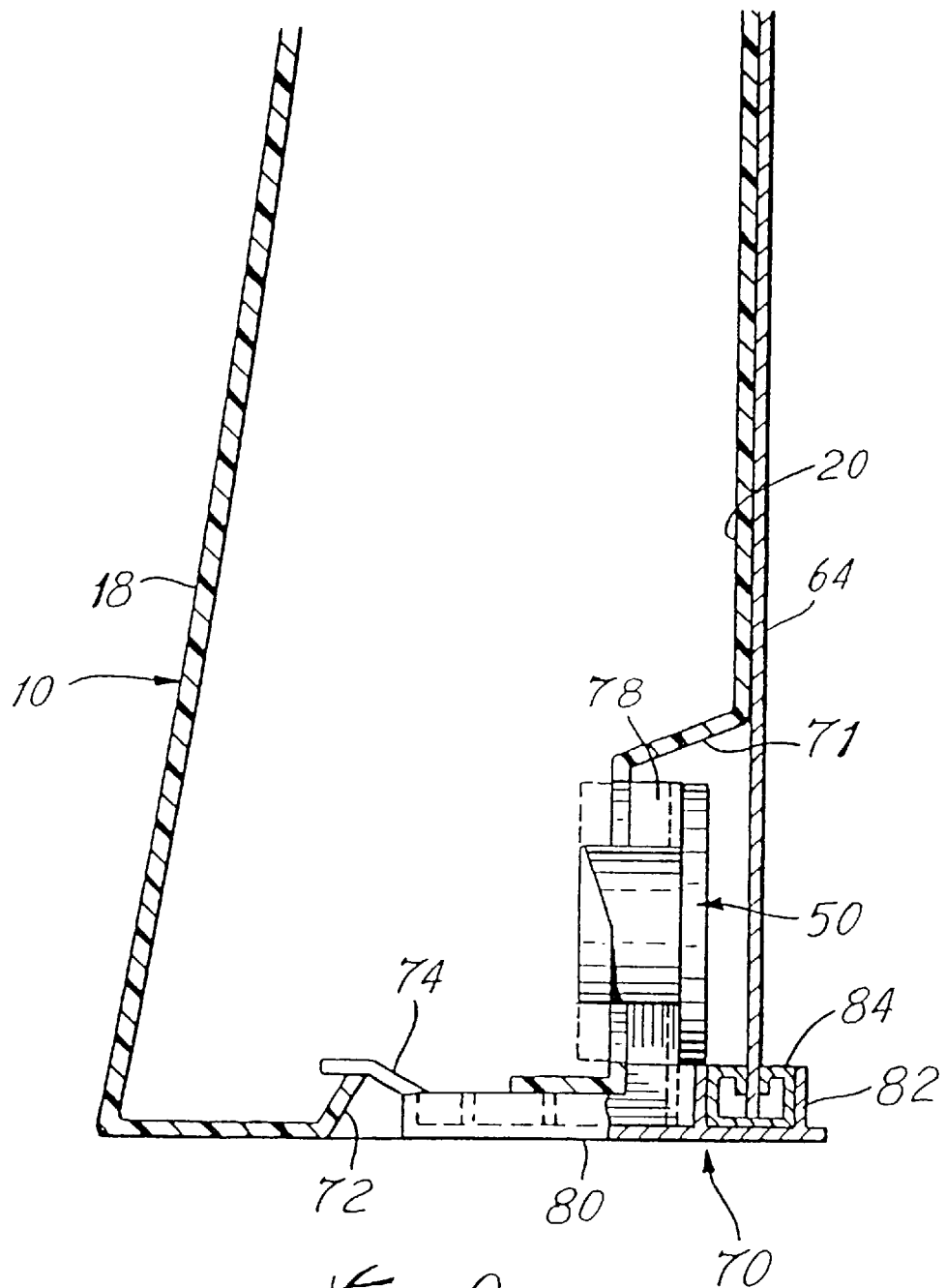
FIG. 9 is a vertical cross-section including the detail of FIG. 7 and FIG. 8.
Figure 10:
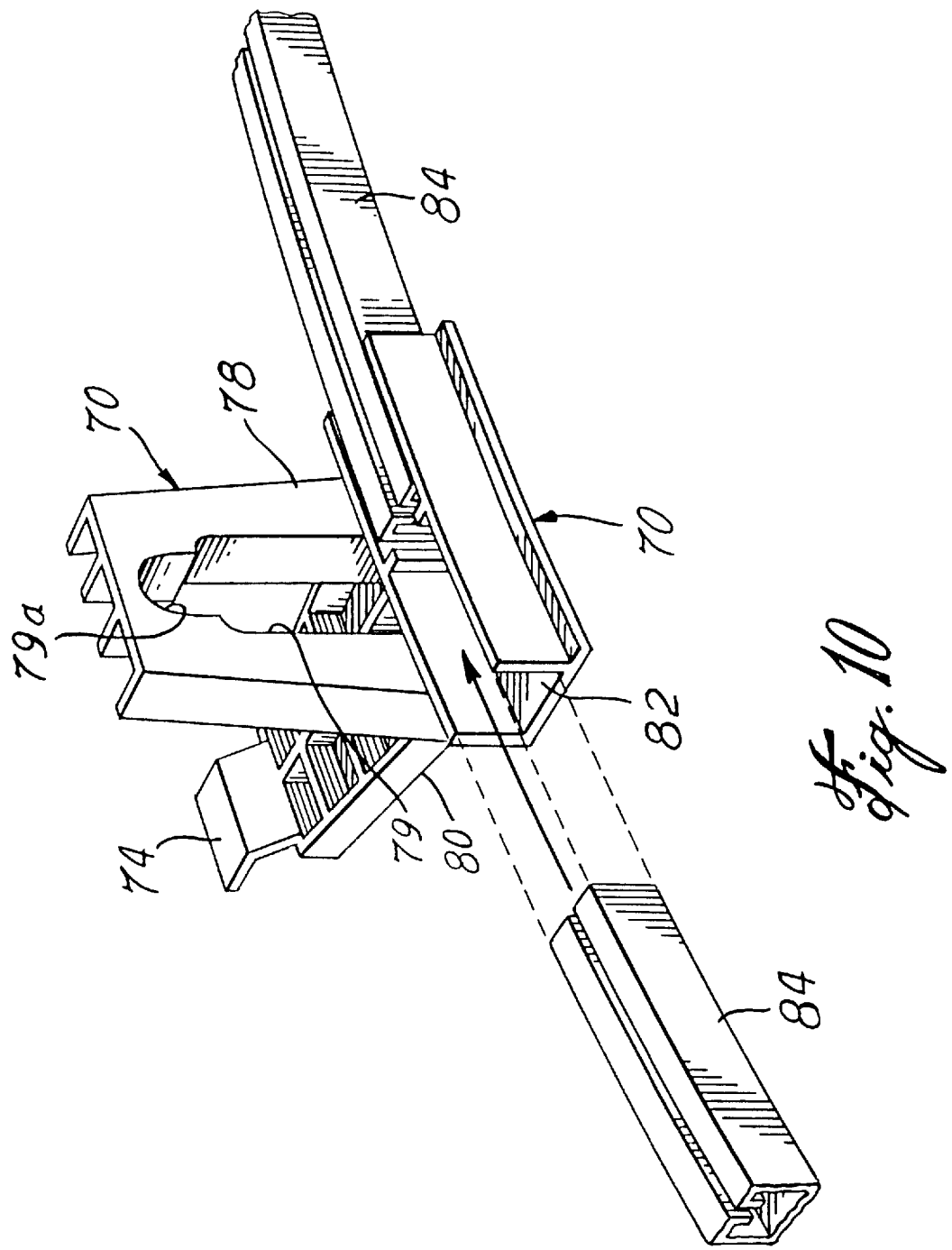
FIG. 10 is a perspective view of the detail illustrated in FIG. 9.

A bracket 70 is illustrated in FIGS. 3, 9, and 10. The bracket has a hook 74 which engages in an opening 72 in the base 12 of a typical post 10. The bracket 70, as seen in FIG. 10, includes an upstanding portion 78 with opening 79 and narrow slot 79a. The bracket also includes base member 80, mounting hook 74 at one end thereof and a rail 82 at the front end of the base member 80. Track segments 84 are telescoped in the rail 82. One track segment 84 extends end to end between two posts and is adapted to receive wall 64. Each bracket 70 is insertable within the base 12 of a respective post 10. The upstanding portion fits into the recessed front wall 14 of the post 10 at the rear of the recess 71. Complementary openings, including opening 79, allow a fastener 50 to be inserted and to lock the bracket 70 with the post 10.

Figure 11:
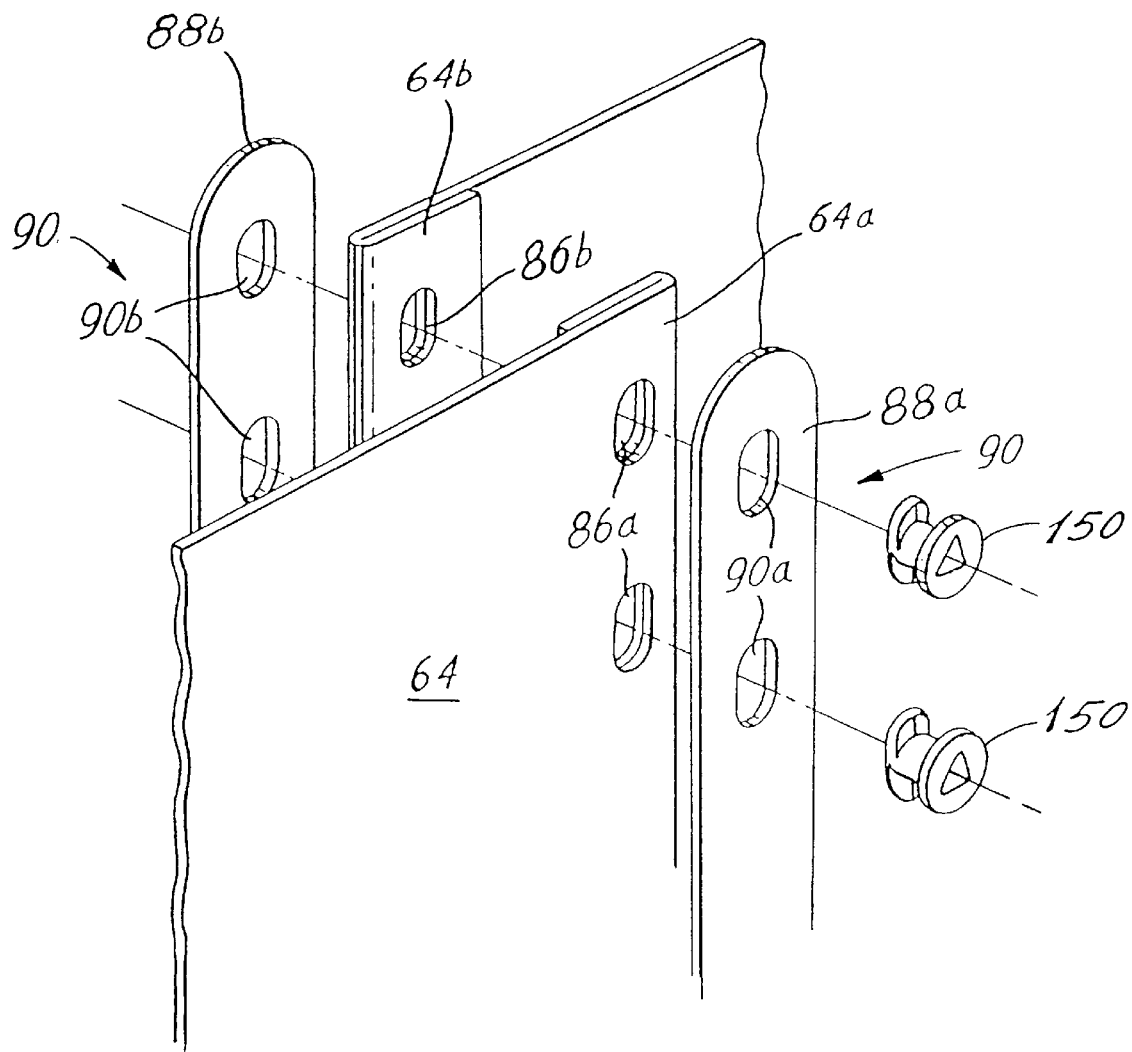
FIG. 11 is an exploded view showing how the ends of a metal band according to the invention are connected together.

An elongated flexible metal panel or wall 64 would typically be inserted in tracks 84, and the top edge would be retained within a recess 76 in the coping 30 when the coping 30 is closed and locked on the posts 10. The ends of the metal panel or wall 64 are folded over, as shown in FIG. 11 at 64a and 64b. These reinforced edges are perforated at 86a, 86b, and metal strips 88a, 88b overlie these edges 64a, 64b and have corresponding openings 90. Metal fasteners 150, similar to fasteners 50, pass through the openings 90a, 86a, 86b, and 90b, to clamp the ends of wall 64 together.

A pool liner 66 is illustrated with the bead 68 overlapping the top edge of the panel 64 within the recess 76.

We claim:

1. A kit for an above ground pool comprising:
   a pool panel;
   a pool liner;
   a plurality of posts, each post molded in one piece from resin material and having a base portion and a top portion, each top portion including a substantially planar shoulder portion and a coping seat elevated relative to a respective shoulder portion;
   a plurality of coping elements, each coping element including a female coupling member and a male coupling member, each male coupling member including a U-shaped slot which telescopingly engages with a respective neighboring female coupling member; and
   singular means for fastening a respective female coupling member to a respective male coupling member and to a respective coping seat to form a joint, each joint includes portions of the respective male coupling member defining the U-shaped slot disposed within the respective female coupling member and a respective coping seat, said coping elements supporting said pool panel and said pool liner while substantially compensating for tolerances and substantially reducing a number of parts needed to support said pool panel and liner.

2. The kit as defined in claim 1, wherein each coping seat includes an elongated opening; each female coupling member includes an elongated opening corresponding to a respective elongated opening of a respective coping seat; each joint includes openings of a respective female coupling member and a respective coping seat in a substantially aligned manner; each singular fastening means includes a cap portion, a stem portion, and a pair of diametrically extending wings projecting from said stem portion, each singular fastening means is inserted in respective openings of a respective female coupling member and a respective coping seat, and each fastening means locking respective coping elements together upon rotation thereof.

3. The kit as defined in claim 2, wherein each male coupling member telescopes longitudinally within a respective female coupling member while each U-shaped slot of a respective male coupling member remains substantially aligned with a respective opening of a respective coping seat, said coping elements facilitate adjustment of respective joints to compensate for tolerances.

4. The kit as defined in claim 1, wherein each post is hollow and is blow-molded from said resin material and includes a base which is larger than a respective coping seat.

5. The kit as defined in claim 1, wherein each coping element is a hollow, blow-molded, one-piece member.

6. The kit as defined in claim 1, wherein each base portion includes means for receiving a bracket and track member segments, each track member segment having a length corresponding to a distance between a respective pair of posts, said track member segments are telescopically secured within respective brackets.

7. A fastener system comprising:

at least two structural members, each structural member including an elongated opening with inner and outer planar surfaces surrounding said opening, each elongated opening including a major axis, each inner planar surface of a respective structural member opposing and contacting an outer respective planar surface of an adjacent respective structural member; and singular fastening means for fastening a pair of said at least two structural members, said singular fastening means including a cap portion, a stem portion, a pair of diametrically extending wings projecting from said stem portion, said singular fastening means passing through the respective opening in each structural member of said pair of structural members when said wings are aligned with the respective major axis of each respective opening, and when said singular fastening means is rotated, said wings engage the inner surface of a respective structural member to lock the pair of structural members, said singular fastening means substantially reducing a number of parts needed to lock a respective pair of structural members.

8. The fastener system as defined in claim 7, wherein the wings have camming surfaces for engaging and urging structural members together when the singular fastening means is rotated.

9. The fastener system as defined in claim 7, wherein the singular fastening means is made of plastics material and injection molded in one piece.

* * * * *